No. 641,719. Patented Jan. 23, 1900.
E. F. MOWER & P. A. COUPAL.
SEWING MACHINE.
(Application filed Sept. 14, 1898.)
(No Model.) 2 Sheets—Sheet 1.
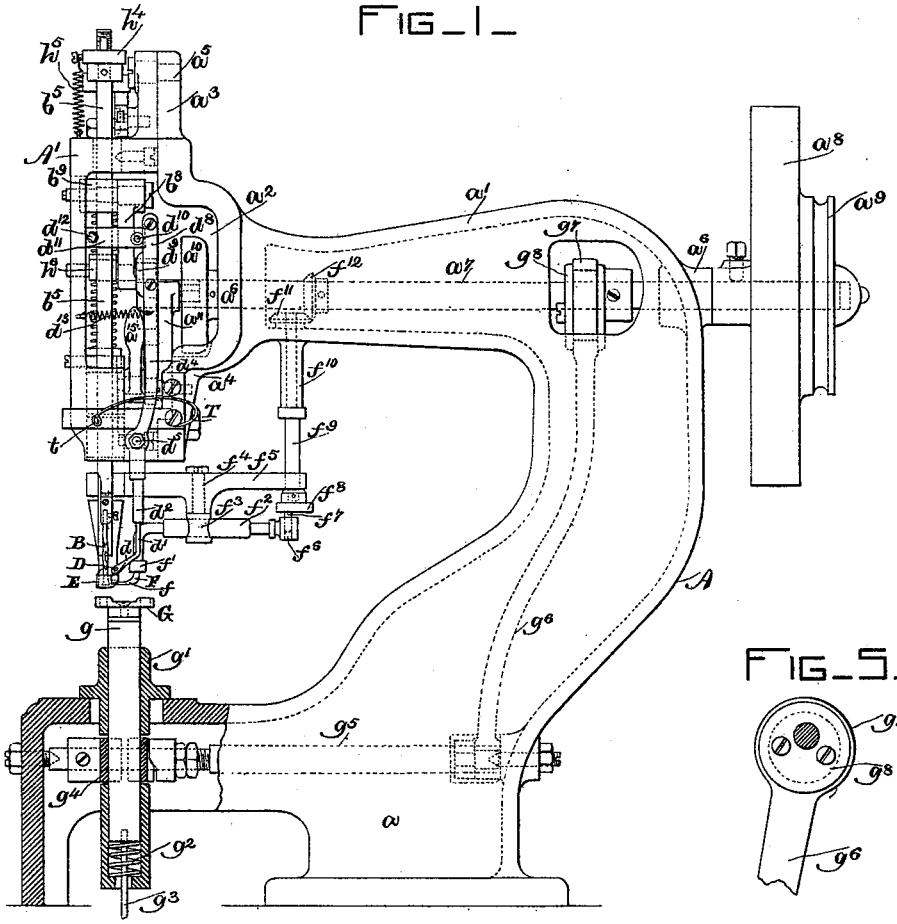
FIG_1_
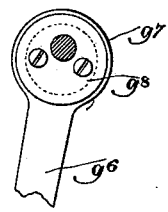
FIG_5_
Witnesses: Inventors,
Edwin F. Mower,
Peter A. Coupal,
by Phillips & Anderson, attys.

No. 641,719. Patented Jan. 23, 1900.
E. F. MOWER & P. A. COUPAL.
SEWING MACHINE.
(Application filed Sept. 14, 1898.)

(No Model.) 2 Sheets—Sheet 2.

UNITED STATES PATENT OFFICE.

EDWIN F. MOWER AND PETER A. COUPAL, OF BOSTON, MASSACHUSETTS, ASSIGNORS TO THE UNITED SHOE MACHINERY COMPANY, OF PATERSON, NEW JERSEY.

SEWING-MACHINE.

SPECIFICATION forming part of Letters Patent No. 641,719, dated January 23, 1900.

Application filed September 14, 1898. Serial No. 690,928. (No model.)

*To all whom it may concern:*

Be it known that we, EDWIN F. MOWER and PETER A. COUPAL, citizens of the United States, residing at Boston, in the county of Suffolk and State of Massachusetts, have invented certain new and useful Improvements in Stitch Forming and Finishing Machines; and we do hereby declare the following to be a full, clear, and exact description of the invention, such as will enable others skilled in the art to which it appertains to make and use the same.

The present invention relates to stitch-forming and stitch-finishing machines, and more particularly to that type of stitch-forming machine wherein the stitches are formed by a single thread, loops of which are forced into the fabric, and which are generally known as "fair-stitch" machines.

The present invention relates, specifically, to certain improvements upon the construction, organization, and mode of operation of the machines shown in Letters Patent of the United States granted to E. F. Mower, No. 556,100, of March 10, 1896, No. 562,335, of June 16, 1896, and No. 563,871, of July 14, 1896, and has for its object to simplify and generally improve the construction and operation of such machines, as will more particularly hereinafter appear.

In the present invention the fabric is punctured and the stitch inserted by a single combined awl and stitch-forming tool instead of having an independent puncturing-awl and stitch-forming tool, as in the former machine. In the present invention also the stitch-forming tool and the stitch-separating tool are simultaneously relatively adjusted in order to position them for variations in the length of the stitch.

The present invention therefore consists of the devices and combinations of devices which will be hereinafter described in the specification and pointed out in the claims appended thereto.

The present invention is shown in the accompanying drawings, in which—

Figure 1 shows the machine in side elevation, a portion of the base of the frame being broken out and other parts shown in section. Fig. 2 shows the machine in front elevation. Fig. 3 shows a detail of the mechanism for actuating the swinging frame and also a portion of the bar of the stitch-separating tool and the adjusting mechanism. Fig. 4 shows in side elevation and section details of the same mechanism. Fig. 5 shows a detail of the actuating mechanism of the work-support-locking device, and Fig. 6 shows a side elevation of the combined awl and stitch-forming tool.

Similar letters of reference will be employed to designate corresponding parts throughout the specification and drawings.

In the drawings, A represents the supporting-frame, which is of the usual sewing-machine type and has a base $a$, which may be supported upon a work bench or table, and also an overhanging gooseneck $a'$, which at its forward end is cut out, as shown at $a^2$, and provided with upwardly and downwardly extending arms $a^3$ and $a^4$; also, along the left-hand side of the forward end, as shown in Fig. 2, with a projecting portion $A^2$, forming a support for the presser-foot bar $e^4$, as will be described.

At the forward end of the gooseneck $a'$ is a swinging frame $A'$, which is pivotally supported at $a^5$ to the arm $a^3$ to swing across the front of the gooseneck $a'$ toward and from the projection $A^2$, and this swinging frame $A'$ carries the stitch-forming and stitch-separating mechanism, all as will be further described.

In suitable bearings $a^6$ of the frame A is mounted the main shaft $a^7$, which at its rear end carries suitable fast and loose pulleys $a^8$ and $a^9$, by means of which a rotary motion may be imparted to the shaft $a^7$ to actuate all the moving parts of the machine.

In the present machine is provided a combined awl and stitch-inserting tool, which will be hereinafter fully described, and which forms the punctures in the work and forces the loops of thread into such punctures to form the stitches, and adjacent to the awl and stitch-inserting tool and mounted on an independent carrier is a stitch-separating tool, which, according as its lower or working end is narrow or wide, will act on the intervals between the stitches to separate the stitches or will act on the intervals between the stitches and the surface of the work adjacent to the stitches, thus separating the stitches and creasing the work adjacent to the stitches at right angles to the line of stitches in a manner which is now quite familiar to those persons who are skilled in the art to which this machine belongs.

The combined awl and stitch-forming tool B, which is shown in detail in Fig. 6 of the drawings, will be hereinafter referred to as the "stitch-forming" tool, and comprises a sharpened lower end $b$, which acts as an awl to puncture the stock for the reception of the loops of thread forming the stitches, and above the awl-point $b$ the stitch-forming tool B has upon its rear face, or to the right, as shown in Fig. 1 of the drawings, a throat $b'$ and a barb or hook $b^2$, which engages the thread carried by the thread-eye to be described and forces a bight or loop of thread into the puncture formed by the awl-point $b$. The stitch-forming tool is also grooved upon diametrically opposite sides, as shown at $b^3$, in order to form seats or recesses to receive the two members of the loop of thread as it is forced into the stock and properly position the thread therein.

The stitch-forming tool B is given a vertically-reciprocating movement toward and from the work and also partakes of the lateral swinging movement of the swinging head A', which swinging movement takes place while the tool B is in the stock to feed the work along a distance equal to the length of a stitch.

The lateral swinging movement of the frame A' is imparted by means of a cam $a^{10}$, mounted near the forward end of the shaft $a^7$ in the recess $a^2$, said cam having a suitable cam-groove in its front face, which receives a cam-roll on the upper end of an angular lever $a^{11}$, which is fulcrumed at $a^{12}$ to the front of the downturned arm $a^4$. The lever $a^{11}$ has upon its front face a segmental groove $a^{20}$, in which is received a roll $a^{21}$ on the inner face of the link $a^{13}$, which in turn is pivotally connected at $a^{14}$ to the swinging frame A'. The link $a^{13}$ has formed integrally therewith a lever or handle $a^{15}$, whereby the link $a^{13}$ may be raised and lowered to move the roll $a^{21}$ along the groove $a^{20}$ to adjust the pivotal connection of the lever $a^{11}$ and link $a^{13}$ to vary the throw of the head A'. The above arrangement is such that a rotation of the shaft $a^7$ will, by means of the cam $a^{10}$, lever $a^{11}$, and link $a^{13}$, impart a lateral swinging movement to the swinging frame A' across the front of the gooseneck $a^7$.

The stitch-forming tool B is fixedly secured by a screw $b^4$ to the lower end of a vertically-reciprocating bar $b^5$, which is mounted to reciprocate in suitable bearings in the swinging frame A'. The bar $b^5$ is reciprocated vertically in order to cause the tool B to enter and be withdrawn from the work by means of a crank $b^6$, carried by the forward end of the shaft $a^7$, to which is pivotally secured at $b^7$ a link $b^8$, which link is in turn pivotally secured to a block $b^9$, which embraces the bar $b^5$ and to which it is adjustably secured by means of a set-screw $b^{10}$.

As the feeding movement of the work is to a great extent imparted by the stitch-forming tool B, it may be desirable to provide a brace for said tool in order to relieve it of much of the strain incident to the feeding of the work, and in the machine of the drawings is shown a brace which consists of a bar $b^{11}$, which is fixedly secured in the lower end of the bar $b^5$ and is inclined toward the shank of the tool B and at its lower end rests against said shank at a point above the hook or barb $b^2$, whereby as the swinging frame A' is moved toward the left, as shown in Fig. 2 of the drawings, with the tool B in the work to effect the feeding of the work, the brace $b^{11}$ will to a great extent relieve the tool from breaking strains.

The thread-eye is shown at D, and, as shown in the drawings, is mounted upon or formed integrally with a downwardly and forwardly bent arm $d$, which is provided with a vertical shank $d'$, which is secured in the lower end of a vertical arm $d^2$, carried by a horizontal arm $d^3$ of a lever $d^4$, which is fulcrumed at $d^5$ to a stud $d^6$ on the side of the swinging frame A', the upper end of the lever $d^4$ being bent horizontally, as shown at $d^7$, and then extended vertically, as shown at $d^8$. In order to rock the lever $d^4$ about its fulcrum $d^5$, and thus cause the thread-eye D to move forward and back to deliver thread to the hook $b^2$ of the tool B, the vertical arm $d^8$ of the lever $d^4$ is provided with a block or projection $d^9$, which is rounded at each end, which block is held in the path of movement of a roller $d^{10}$, carried by a bracket $d^{11}$, secured by a clamping-bolt $d^{12}$ to the bar $b^5$. The upper arm $d^8$ of the lever $d^4$ is held against the roller $d^{10}$ by means of a spring $d^{13}$, one end of which is secured to said lever and the other end of which is secured to the frame A'. The bracket $d^{11}$ may be adjusted vertically along the bar $b^5$ to change the time of operation of the lever $d^4$ and the thread-eye D. The above-described arrangement is such that as the bar $b^5$ descends to cause the stitch-forming tool B to puncture the work and insert the stitch the roll $d^{10}$ will come in contact with the block $d^9$ and rock the lever $d^4$ to cause the thread-eye D to move forward and deliver the thread to the hook $b^2$ of the tool B, and as the bar $b^5$ ascends and the roll $d^{10}$ rides off the block $d^8$ the spring $d^{13}$ will rock the lever $d^4$ in the opposite direction and throw the thread-eye D back to its original position.

E represents the presser-foot, which, as shown, has a foot $e$, cut out, as shown at $e'$, and a shank $e^2$, which is secured by means of a set-screw $e^3$ to the lower end of a presser-foot bar $e^4$, which is arranged to slide in suitable bearings in the projection A² of the frame A. The bar $e^4$ is surrounded by a spring $e^5$, which at one end bears against a collar $e^6$, secured to said bar, and at its upper end engages the under side of the upper end of the projection A². The upper end of the bar $e^4$ is passed through the top of the projection A² and is threaded, as shown at $e^7$, and upon the threaded end are secured suitable stop-nuts $e^8$ to limit the downward movement of the bar and presser-foot. Above the stop-nuts $e^8$ is secured a head $e^9$, which is threaded upon the bar $e^4$, and the under side of this head $e^9$ is engaged by one arm of a lever $e^{10}$, fulcrumed at $e^{11}$ on the swinging frame A', the other arm of said lever $e^{10}$ being extended in position to be engaged by a head $b^{12}$ on the upper end of the rod $b^5$ of the tool B. The above arrangement is such that the spring $e^5$ forces the presser-foot E down upon the work to clamp the work during the downward movement of the stitch-forming tool B to puncture the work and form a stitch; but after the stitch is formed and as the bar $b^5$ completes its downward stroke the head $b^{12}$ on the upper end of the rod $b^5$ engages the lever $e^{10}$ and rocks it about its fulcrum, causing the said lever to raise the rod $e^4$ and the presser-foot E against the tension of the spring $e^5$ to release the work during the subsequent swinging of the frame A' to the left, as shown in Fig. 1, to feed the work the distance required for the new stitch.

In the machine of the patents hereinbefore referred to there is shown a device called a "stitch-slackener" or "thread-slackening" device, which engages the standing thread between the stitch-forming tool and the work and moves the thread laterally toward the stitch last formed, thus slightly bending the thread over and forming a bight or loop, as it were, pulling off sufficient thread, so that in forcing in the loop of thread to form the next stitch the thread in the preceding stitch will not be drawn out. In its movements the thread-slackener has a movement at right angles to the line of stitches in order to place its point beneath the standing thread and at a point between the tool B and the last stitch formed, and is then moved laterally toward the last stitch formed while the tool B is descending with a loop of thread, and just before the tool B reaches its downward position, or before it has forced the loop of thread held by the hook $b^2$ into the work, the thread-slackener is moved back to the right, as the machine is shown in Fig. 2, and thence withdrawn from the loop of thread, which is then drawn down and laid upon the surface of the work by the farther downward movement of the stitch-forming tool in forming the stitch. It is very essential that the movement of the thread-slackener be accurate and uniform, and in the present machine a simple form of mechanism has been provided which will secure the desired results. In the drawings the thread-slackener is shown at F, and comprises a pointed finger $f$, extending forwardly toward the presser-foot, which is cut out upon its under face, as shown at $e^{12}$, to permit the thread-slackener to be projected beneath the presser-foot and under the thread, as before described, and also to have a lateral movement while so projected. The finger $f$ is clamped to the lower end of an arm $f'$, which is carried by a shaft $f^2$, which is mounted to slide in a bearing $f^3$, pivotally secured at $f^4$ to a support $f^5$, which support at its forward end is clamped to the presser-foot bar $e^4$ and at its rear end has a sliding engagement with a shaft which actuates the thread-slackener, which will be further described. The shaft $f^2$ at its rear end is provided with a hole $f^6$, in which fits a crank-pin $f^7$, projecting downwardly from a head $f^8$, secured to the lower end of a vertical shaft $f^9$, mounted to rotate in a bearing $f^{10}$, the upper end of the shaft $f^9$ carrying a bevel-gear $f^{11}$, which meshes with a bevel-gear $f^{12}$ on the shaft $a^7$. The above-described arrangement is such that a rotation of the shaft $a^7$ will, by means of the bevel-gears $f^{12}$ and $f^{11}$, cause a rotation of the shaft $f^9$ and by means of the crank-pin $f^7$ cause the shaft $f^2$ to slide back and forth through its bearing $f^3$ and to swing about its fulcrum $f^4$, thus imparting to the thread-slackener F a forward-and-backward movement to project and withdraw it from the loop of thread, and also a movement from side to side while in the loop of thread, as above described.

In these machines as heretofore constructed the stitch-separating tool has usually been mounted upon the same bar as the stitch-forming tool and positioned in such relation to the stitch-forming tool that it would enter the space between the finished and the partially-formed stitch to separate and indent the stitches. The relation of the stitch-forming and stitch-separating tool was fixed and uniform, and no variation of the length of the stitches could be secured without taking off the head and the stitch forming and separating tools and substituting another head and tools with different adjustments.

It is necessary at times to vary the feed of the work, and consequently the length of the stitch, in working upon the same piece of work, as in a shoe the length of feed of the work is increased and the stitch lengthened along the shank, while along the ball and fore part the feed and stitch are shortened, and this adjustment must take place while the machine is in operation. It is necessary that the stitch-separating tool be adjusted toward and from the stitch-forming tool according as the feed and stitch are shortened or lengthened, and in the machine of the drawings the stitch-separating tool is mounted and actuated independently of the stitch-forming tool, but is connected with the mechanism which adjusts the lateral swinging movements of the stitch-forming tool, whereby as the feeding movement of the stitch-forming tool is varied to lengthen or shorten the stitch the stitch-separating tool will be simultaneously adjusted away from or toward the stitch-forming tool to bring the point of the stitch-separating tool in a position to act upon the intervals between the stitches.

The above-suggested result is accomplished in the machine of the drawings by the following mechanisms:

The stitch-separating tool is shown at H and at its lower end is suitably formed to act upon the space or interval between two adjacent stitches, the formation of its working end being dictated by the character of finish it is desired to impart to the seam—that is, it may be provided with a point to act upon the space between the stitches only to separate the stitches and cause them to assume the finished and rounded appearance which is so much desired, or it may have a wide working end adapted to act upon the space between the stitches and also mark or crease the surface of the work adjacent to the line of stitches and at right angles thereto, imparting a finish to the stitched surface which is now well known and much used in finishing the outseams in leather-work, and particularly in boots and shoes.

The stitch-separating tool H is secured in the lower end of a bar $h$, which is arranged to have a vertical reciprocation in a bearing $h'$, and a bearing $h^2$, arranged to have a lateral adjustment in the swinging frame A', by means of which the bar $h$ and the tool H may be laterally adjusted across the swinging frame A' to place its working end nearer to or farther from the stitch-forming tool B, according as the stitches being made are short or long.

In the machine of the drawings the stitch-separating tool is normally maintained at such a vertical position that its working end will engage or rest lightly upon the crowns of the stitches as the work is fed along, and it is positively raised and forced into the work by instrumentalities carried by the bar $b^5$ of the stitch-forming tool, all as will be now explained.

The bar $h$ at its upper end extends through the top of the swinging frame A' and carries a head or cross-piece $h^4$, to which is secured one end of a coiled spring $h^5$, the opposite end of said spring being secured to the top of the swinging frame A', the spring $h^5$ acting to hold the bar $h$ and the stitch-separating tool H down, so that the working end of said tool will engage the stitches of the seam, as before explained.

The bar $h$ is raised to elevate the tool H by the upward movement of the bar $b^5$ of the stitch-forming tool by means of a head $b^{12}$, carried by the upper end of the bar $b^5$, which head $b^{12}$ engages the under side of the head $h^4$ as the bar $b^5$ nears the termination of its upward throw, and thus raises the bar $h$ and the stitch-separating tool H during the time that the swinging frame A' is returning preparatory to placing the tool B in position to again puncture the work and form a new stitch. As the bar $b^5$ and stitch-forming tool B move downward the head $b^{12}$ releases the head $h^4$ and permits the spring $h^5$ to throw down the rod $h$, bringing the stitch-separating tool H into the space between two stitches, and as the bar $b^5$ approaches the limit of its downward movement the block $b^9$ on the bar $b^5$ comes in contact with a block $h^6$ on the bar $h$, striking it a quick sharp blow, thus forcing the working end of the tool H into the space between two stitches and separating or creasing the work at such point.

In order to adjust the tool H for variations in the length of the stitch, as hereinbefore explained, the bearings $h'$ and $h^2$ are permitted to slide toward and away from the bar $b^5$ of the stitch-forming tool B, and to secure such adjustment simultaneously with the adjustment of the lateral throw of the swinging frame A' the link $a^{13}$ carries upon its front face a stud $h^7$, upon which is mounted a segmental block $h^8$, which block fits into a segmental groove $h^9$, formed in the rear face of the bearing $h'$, whereby as the link $a^{13}$ is moved up or down by means of the handle $a^{15}$ to vary the position of the roll $a^{21}$ along the groove $a^{20}$ of the lever $a^{11}$ to adjust the swinging movement of the frame A' the block $h^8$ will be moved along the groove $h^9$, and thus move the working point of the tool H nearer to or farther away from the stitch-forming tool B. In order to maintain the adjustment, the lever $a^{13}$ is provided in its end with a bearing $h^{10}$, in which is placed a sliding bolt $h^{11}$, forced outwardly by a spring $h^{12}$ in said bearing, the outer end of said bolt $h^{11}$ being arranged to engage suitable seats or depressions $h^{13}$, formed along the base of the segmental groove $h^9$.

The work-support G is mounted upon the upper end of a stem $g$, which is arranged to slide in a bearing $g'$, supported by the base $a$ of the frame A, and beneath the stem $g$ is placed a coiled spring $g^2$, which rests upon the bottom of the bearing $g'$. The spring $g^2$ acts to raise the work-support G, and thus force the work against the under side of the presser-foot E, and in order to depress the work-support G when placing work in the machine or in removing work therefrom the stem $g$ is connected by a rod $g^3$, which passes through an aperture in the base of the bearing $g'$, with a suitable foot-treadle. (Not shown.)

It is necessary to lock the work-support G at the time the stitch-forming tool B and the stitch-separating tool H are operating upon the work, and for this purpose the stem $g$ is surrounded by a split clamp $g^4$, substantially like the clamp of the machine of Patent No. 563,871, hereinbefore referred to, and said clamp is alternately clamped and released by the action of complementary cam-faces and a rock-shaft, as in said patented machine. The mechanism for rocking the rock-shaft has, however, in the present machine been greatly simplified over the construction in such patented machine. In the present invention the rock-shaft is shown at $g^5$, and at its rear end is fixedly secured a lever $g^6$, which at its upper end is provided with an eccentric-strap $g^7$, embracing an eccentric $g^8$ on the main shaft $a^7$, whereby as said shaft $a^7$ rotates it will rock the lever $g^6$, and thus rock the shaft $g^5$ and cause it by means of the complementary cam-faces to alternately clamp and release the clamp-collar from the stem $g$ of the work-support.

In order to prevent the bearing $h'$ from rising and becoming displaced vertically, it is provided upon its rear face with a groove $h^{20}$, into which fits a stud $h^{21}$ on the end of a screw $h^{22}$, tapped into a threaded aperture $h^{23}$. The machine may be provided with any usual form of spring take-up T, having the usual thread-guide $t$.

The operation of the various instrumentalities has been described in detail in connection with the foregoing description of their form and arrangement; but a general description of the machine will now be set forth.

Assuming that a piece of work is in position on the work-support and the work is clamped between the work-support and presser-foot and that a stitch has just been formed and indented and the swinging frame moved to the right, with the stitch-forming and stitch-separating tools raised, a rotation of the shaft $a^7$ will now rock the lever $g^6$ and cause the complementary cam-faces to lock the clamp about the stem $g$ of the work-support and prevent it from being depressed during the action of the stitch forming and separating tools. The stitch-forming tool will be lowered by means of the crank $b^6$ and the link $b^8$, and just before the point $b$ reaches the stock, or while it enters the surface of the stock, the thread-eye D will advance and deliver the thread to the barb $b^2$ of the stitch-forming tool, which upon its farther descent punctures the work and carries the bight or loop of thread into such puncture. As the stitch-forming tool descends the thread-slackener F is advanced and its point placed beneath the standing thread, between the stitch-forming tool and the stitch last formed, and is also moved toward the stitch last formed, thus bending or buckling the thread, as it were, and forming a loop for the crown of the stitch being formed. Before the stitch-forming tool reaches the limit of its downward movement the thread-slackener is withdrawn from the loop of thread and moved back to its original position and leaves the loop of thread free to be laid upon the surface of the material by the farther downward movement of the stitch-forming tool, thus forming the crown of the stitch. During the descent of the stitch-forming tool the head $b^{12}$, having released the head $h$, the spring $h^5$ will have forced the stitch-separating tool against the line of stitches and into the space between two stitches, either between two completed stitches or a completed stitch and the stitch being formed, and as the stitch-forming tool reaches its complete downward movement the block $b^9$ comes in contact with the block on the bar of the stitch-separating tool, thus forcing the working end of said tool to mark or crease the work at such point. At this time and while the stitch-forming tool is still in the work and the stitch-separating tool is in the space between two stitches the presser-foot E is raised by means of the lever $e^{10}$ and the swinging frame A' moved toward the left a distance equal to the length of the stitch being formed, and then the stitch-forming tool and stitch-separating tool are raised and withdrawn from the work, releasing the presser-foot, which again drops upon the material, and the swinging frame is then moved to the right to place the stitch-forming and stitch-separating tools in position to again operate as described. At this time the thread-eye is retracted and the work-support released and the parts assume the positions which they had when the work begun. The operation is repeated as described until the piece of work then being operated upon is finished.

In this connection it is to be noted that during the feeding of the work the working end of the stitch-separating tool is in engagement with a space between two stitches and assists the stitch-forming tool in feeding the work, thus relieving the stitch-forming tool from some of the strain incident to the feeding of the work.

Having described the construction and mode of operation of our invention, we claim as new and desire to protect by Letters Patent of the United States—

1. The combination with stitch-forming and stitch-separating mechanisms, of means for adjusting the stitch-forming mechanism to vary the length of stitch, and means to adjust the stitch-separating mechanism relatively to and simultaneously with the adjustment of the stitch-forming mechanism, substantially as described.

2. The combination with a laterally-movable head, of stitch-forming and stitch-separating tools mounted in said head, means to actuate said head and tools, means for varying the lateral movement of the head and mechanism for adjusting the working end of the stitch-separating tool toward and from the stitch-forming tool simultaneously with the adjustment for varying the lateral movement of the head, substantially as described.

3. The combination with a swinging frame, of vertically-reciprocating bars mounted in said swinging frame, a stitch-forming tool carried by one bar and a stitch-separating tool carried by the other bar, means to vary the swinging movements of the swinging frame, connected mechanism to adjust the stitch-separating tool and its bar toward and from the stitch-forming tool and its bar, simultaneously with the adjustment of the movement of the swinging frame, and a retaining device to maintain said adjustment, substantially as described.

4. The combination with a stitch-forming tool, and means to move said tool toward and from the work, of a thread-slackener, arranged to be projected toward and from the line of stitches formed by the stitch-forming tool, and to have a lateral movement toward and away from the said tool between said tool and the standing thread, a horizontal reciprocating rod, carrying said thread-slackener, a pivoted bearing for said rod and means to reciprocate and oscillate said rod, substantially as described.

In testimony whereof we affix our signatures in presence of two witnesses.

EDWIN F. MOWER.
PETER A. COUPAL.

Witnesses:
T. HART ANDERSON,
HORACE VAN EVEREN.